US012252846B2

(12) United States Patent
Kocher et al.

(10) Patent No.: US 12,252,846 B2
(45) Date of Patent: Mar. 18, 2025

(54) MULTI-LAYER PRINTING SUBSTRATE WITH HIDDEN INFORMATION

(71) Applicant: Landqart AG, Landquart (CH)

(72) Inventors: Christoph Kocher, Landquart (CH); Muriel Schuler, Chur (CH); Martin Demierre, Nyon (CH)

(73) Assignee: Landqart AG, Landquart (CH)

( * ) Notice: Subject to any disclaimer, the term of this patent is extended or adjusted under 35 U.S.C. 154(b) by 211 days.

(21) Appl. No.: 17/916,693

(22) PCT Filed: Mar. 25, 2021

(86) PCT No.: PCT/EP2021/057682
§ 371 (c)(1),
(2) Date: Oct. 3, 2022

(87) PCT Pub. No.: WO2021/197993
PCT Pub. Date: Oct. 7, 2021

(65) Prior Publication Data
US 2023/0151551 A1    May 18, 2023

(30) Foreign Application Priority Data
Apr. 2, 2020 (EP) .................................... 20167810

(51) Int. Cl.
    *D21H 27/36*      (2006.01)
    *A63F 3/06*      (2006.01)
    (Continued)

(52) U.S. Cl.
CPC ............... *D21H 27/36* (2013.01); *B26F 1/38* (2013.01); *B32B 3/266* (2013.01); *B32B 27/08* (2013.01);
(Continued)

(58) Field of Classification Search
CPC ........ D21H 27/36; D21H 21/42; D21H 21/44; D21H 23/46; B26F 1/38; B32B 3/266;
(Continued)

(56) References Cited

U.S. PATENT DOCUMENTS

| 700,761 A | 5/1902 | Goodell |
|---|---|---|
| 3,900,219 A | 8/1975 | D'Amato et al. |

(Continued)

FOREIGN PATENT DOCUMENTS

| GB | 2 252 270 A | 8/1992 |
|---|---|---|
| WO | 03/027953 A1 | 4/2003 |

(Continued)

OTHER PUBLICATIONS

International Search Report for PCT/EP2021/057682 dated, Apr. 30, 2021 (PCT/ISA/210).

*Primary Examiner* — Justin V Lewis
(74) *Attorney, Agent, or Firm* — Sughrue Mion, PLLC

(57) ABSTRACT

A security paper, having a first paper ply and a second paper ply, and a plastic ply made of a thermoplastic polymer material arranged between the paper layers (1, 2), wherein a strip-shaped tear-off film is embedded between the paper layers on the inner side of the second paper layer and at least partially embedded into the plastic layer. Hidden information is arranged on the inner side of the first paper ply and is covered by the strip-shaped tear-off film or is arranged on the surface of the strip-shaped tear-off film facing the first paper ply. The hidden information can be exposed by the strip-shaped tear-off film together with a strip of the second paper ply being irreversibly torn off the multi-layer substrate.

28 Claims, 3 Drawing Sheets

(51) Int. Cl.
*B26F 1/38* (2006.01)
*B32B 3/26* (2006.01)
*B32B 27/08* (2006.01)
*B32B 27/18* (2006.01)
*B42D 25/328* (2014.01)
*B42D 25/351* (2014.01)
*B42D 25/46* (2014.01)
*D21H 21/42* (2006.01)
*D21H 21/44* (2006.01)
*D21H 23/46* (2006.01)
*B41M 3/14* (2006.01)
*B42D 25/305* (2014.01)
*B42D 25/355* (2014.01)
*B42D 25/369* (2014.01)
*B42D 25/378* (2014.01)

(52) U.S. Cl.
CPC ............ B32B 27/18 (2013.01); B42D 25/328 (2014.10); B42D 25/351 (2014.10); B42D 25/46 (2014.10); D21H 21/42 (2013.01); D21H 21/44 (2013.01); D21H 23/46 (2013.01); *A63F 3/069* (2013.01); *B32B 2260/028* (2013.01); *B32B 2260/046* (2013.01); *B32B 2307/718* (2013.01); *B32B 2554/00* (2013.01); *B41M 3/14* (2013.01); *B42D 25/305* (2014.10); *B42D 25/355* (2014.10); *B42D 25/369* (2014.10); *B42D 25/378* (2014.10)

(58) Field of Classification Search
CPC ........... B32B 3/26; B32B 27/08; B32B 27/18; B32B 2260/028; B32B 2260/046; B32B 2307/718; B32B 2554/00; B42D 25/351; B42D 25/305; B42D 25/355; B42D 25/378; A63F 3/069; A63F 3/06; B41M 3/14
USPC ....... 281/5, 7, 9, 10, 14; 283/61, 62, 67, 70, 283/72, 74, 94, 98, 100, 108, 901
See application file for complete search history.

(56) References Cited

U.S. PATENT DOCUMENTS

| | | | |
|---|---|---|---|
| 4,726,608 | A | 2/1988 | Walton |
| 4,787,950 | A | 11/1988 | Meloni et al. |
| 5,314,560 | A | 5/1994 | Pritchet |
| 5,484,996 | A | 1/1996 | Wood |
| 6,609,662 | B2 | 8/2003 | Annacone et al. |
| 2011/0012336 | A1* | 1/2011 | Rosset ................... D21H 21/40 283/67 |
| 2019/0184270 | A1 | 6/2019 | Mitchell, Jr. |

FOREIGN PATENT DOCUMENTS

| | | |
|---|---|---|
| WO | 2004/076198 A1 | 9/2004 |
| WO | 2006/066431 A1 | 6/2006 |
| WO | 2020/037329 A2 | 2/2020 |

* cited by examiner

MULTI-LAYER PRINTING SUBSTRATE WITH HIDDEN INFORMATION

CROSS REFERENCE TO RELATED APPLICATIONS

This application is a National Stage of International Application No. PCT/EP2021/057682 filed Mar. 25, 2021, claiming priority based on European Application No. 20 167 810.9 filed Apr. 2, 2020.

TECHNICAL FIELD

The present invention relates to a multilayer printing substrate comprising hidden information, for example for use as a value card, prepaid card, voucher, lottery ticket, crypto wallet, crypto token, crypto certificate, crypto banknote or the like.

PRIOR ART

Value documents, for example prepaid or voucher cards, are often provided with a code that is required to release the credit on the card. To ensure that this cannot happen without authorization before the card is sold, the code is opaquely sealed. Only upon purchase is the seal removed to render the code accessible. This voids the card.

Various solutions are known from the prior art. For example U.S. Pat. No. 4,726,608 describes a document such as for example a lottery ticket having an opaque coating comprising metal particles which hides an underlying code. Scratching off the coating exposes the code and voids the document.

US2019/0184270 describes an analogous application, wherein the layer removable by scratching is also printable by thermal printing.

U.S. Pat. No. 4,787,950 describes a similar application but in this case the code is covered with a sticker that is provided with a scratchable opaque layer.

U.S. Pat. No. 6,609,662 describes an analogous application for a telephone card, wherein the sticker comprises an opaque layer which can be peeled off as a whole.

U.S. Pat. No. 5,314,560 in turn describes the production of such stickers for hot stamping applications. GB-A-2252270 likewise proposes a scratchable coating for exposing information previously unreadable due to the coating. This application provides not only the unreadable information but also information that is readable without removal of the coating. The readable information can be used, for example, to retrieve the value stored on the card, but without using and voiding the card. Only when the card is to be used is the hidden information exposed and use of the card authorized by comparison of the readable and unreadable information (for example by telephone).

WO-A-2003027953 proposes another approach and describes a pre-paid telephone card composed of two halves folded together so that a printed PIN code is located inside the card and made visible by separating the two halves of the card from one another.

What these and other examples known from the prior art have in common is that they attempt to provide a means which makes the exposure of hidden information detectable. The known solutions must allow the hidden information to be exposed only through irreversible alteration of the document. However, this is only partially successful. An opaque coating can be restored, an opaque label can be replaced, a folded and opened document can be resealed. It is thus possible, with fraudulent intent, to unlock and use the value of such a document, to restore the now worthless document to such an extent that its voiding is not easily detectable and to resell it at its original value.

This can be particularly detrimental if such a document is a so-called crypto wallet, crypto certificate or crypto token, i.e. a physical document with which a certain value of a crypto currency is linked. Such a document usually contains two codes, a public key and a private key. These are linked to one other via a blockchain. The principles on which this technology is based are known from the prior art. The public key is freely readable or at least detectable, for example as a OR code. It can be used to retrieve the value stored on the document. The private key is hidden and only accessible by exposing it. The combination of the public key and the private allows the value of the document in cryptocurrency to be credited or paid out in a physical currency, or the cryptocurrency can be used for payment.

Such a solution, in which the private key is hidden under a scratch-off label, is marketed by Bitcoin Suisse for example (Currency News 17(10), 2019, ISSN 2516-6336). With this solution too, it is possible, with criminal intent, to restore or replace the scratch-off label to such an extent that the voided document can be fraudulently passed on or resold.

A similar solution is proposed in WO-A-2020/037329. What is proposed here is a banknote-like document ("note") which has a unique identification feature ("identifier"), for example a serial number, and a hidden identification feature ("hidden identifier"), which are linked to one another via a blockchain. The hidden identification feature is printed on one side of the banknote-like document and opaquely covered with a removable cover layer ("removable cover"). On the opposite side of the banknote-like document the site of the hidden identification feature is additionally provided with a protective layer ("backing") to prevent readability from the back of the banknote-like document. The removable cover layer is peeled off or scraped off to make the hidden identification feature accessible. This solution also has the abovementioned advantages that such a cover layer can be restored with fraudulent intent.

US-A-2011012336 discloses a security sheet which comprises exposable information and a preferably fibrous substrate, into which preferably a tape, which has a surface A and a surface B and is peelable along its surface B, is completely embedded, wherein the exposable information is carried by the tape and/or is provided opposite the surface B of the tape. Also described is a process for producing the security sheet and a security document or security article comprising such a sheet U.S. Pat. No. 3,900,219 describes a document comprising a hidden mark which cannot be observed without damaging the document. Specifically, it concerns a document comprising a hidden feature, comprising: a base sheet having a marking printed on one side thereof in at least one area spaced inwardly from all edges of the sheet; b. an opaque sheet smaller than the base sheet and overlying said area, said opaque sheet being separable from the base sheet; c. a cover sheet overlying said opaque sheet and larger than the opaque sheet so that portions of the cover sheet extend beyond the opaque sheet throughout at least a major part of its periphery, said cover sheet being adhesively attached to the opaque sheet and having said extending portions adhesively attached to the base sheet; d. said opaque sheet having one edge accessible so that it may be gripped to displace the opaque sheet and tear the overlying attached cover sheet along the edges of the opaque sheet to expose the marking on the base sheet, so that the torn edges of the cover sheet become visible.

U.S. Pat. No. 700,761 describes a railway ticket comprising a body having a destination-point indicated thereon, an opaque shield covering such indication, and a facing applied to the body over the shield, the body, shield and facing being weakened to present a detachable tongue bearing the destination indication.

U.S. Pat. No. 5,484,996 describes a barcode deactivation system for deactivating a barcode to prevent reading of the barcode. The purpose of deactivating the barcode is that the barcode cannot be used to direct containers to the wrong places when the barcodes are used for optical scanning and sorting.

This document is only mentioned here for the sake of completeness in recognition of the prior art as an example of an article which is irreversibly damaged by a tear-open means. It is not an object of the present invention to destroy information by tearing open but rather to make such information accessible.

SUMMARY OF THE INVENTION

It is accordingly an object of the present invention, inter alia, to provide a multilayer substrate, in particular as a print carrier in the form of a security paper, which makes it possible to bear information in hidden form and to make this information visible or readable but only by irreversibly destroying the multilayer substrate, i.e. it is ensured that after exposing the hidden information it is no longer possible to restore the original state to give the impression that nothing has been manipulated.

It is a further object of the invention to provide a document which comprises a first piece of information which is visible or readable without exposing it and a second piece of information which can be made visible or readable only by exposing it. In a preferred embodiment the first piece of information has been introduced inside the document but is visible or readable from the outside. It is therefore protected in unchangeable form inside the document but is visible or readable from the outside whereas information that has been applied to the outside of a document without further measures can be changed, for example by addition or removal of parts of this information. In this respect, the present invention differs from the recited documents of the prior art which, while each comprising one or more pieces of information, all require that these pieces of information must first be made visible by exposing them. The first and second pieces of information are preferably correlated, i.e. they form the actual useful information together, for example in the form of an access code or the like.

In a first aspect of the present invention said invention relates to a multilayer substrate comprising at least one first paper ply, at least one second paper ply and a plastic layer arranged between the paper plies and directly bonded to the paper plies on both sides which is made of at least one thermoplastic polymeric material, wherein between the paper plies on the inside of the second paper ply and at least partially embedded in the plastic layer a strip-shaped tear film is embedded.

The multilayer substrate is characterized in that on the inside of the first paper ply and perpendicular to and, viewed from the side of the second paper ply, covered by the strip-shaped tear film or on the surface of the strip-shaped tear film facing the first paper ply and covered at least by the first paper ply (and optionally further cover layers) hidden information is arranged, wherein the hidden information can be exposed by irreversibly tearing the strip-shaped tear film out of the multilayer substrate together with a strip of the second paper ply.

In the present context hidden information is to be understood as meaning information which in the case of the intact print carrier cannot be read or made visible from the outside, for example also cannot be detected by the human eye in transmitted light and preferably also cannot be made visible using technical aids such as for example a strong light source or a CCD camera, optionally in conjunction with an IR transmitted light source. It therefore concerns in particular characters or other, for example digital, information (barcode or the like) which are completely hidden until the tear film is torn out. It therefore does not concern hidden information that cannot be detected only when illuminated from above but rather concerns hidden information that cannot be detected or read either in incident light or in transmitted light.

Substrates of this type having two outer paper layers and a central plastic layer are in principle known from the prior art from the field of banknotes: reference is made to WO-A-2004/076198 or WO-A-2006/066431. However, what is not known from the prior art is that such carrier structures in the above sense can be employed, i. e. that it is possible to embed a tear film in the form of a strip and to provide hidden information between the two layers of paper, so that this hidden information can be made visible by tearing out the strip-shaped tear film.

The strip of the paper layer, preferably cotton-based security paper, torn out when tearing out the tear film has a naturally frayed. irregular and random edge, and it is impossible to restore the smooth original structure by manipulation once the strip-shaped tear film has been torn out. This unexpectedly ensures a very high level of security, which proves to be advantageous in particular when, for example, in a crypto token a private key is to be embedded in a manner that is forgery-proof and tamper-proof but still readable; the public key can then be printed on the surface for example or, as is particularly preferred, optionally also be provided on the tear film in such a way that it is visible through windows. The public information is preferably a unique identification feature associated with a single document. In the simplest case this may be the serial number of the document. The hidden information is also preferably a unique identification feature assigned to a single document or a single piece of public information of such a document.

At the time of issuance or in connection therewith the hidden information is specified for example in a blockchain such as that of a cryptocurrency (for example bitcoin or another cryptocurrency) or a blockchain chosen as decisive by the issuer of the document. Thus, the value of the hidden information can be verified later by a third party. The hidden information is covered on both sides to prevent misuse. The public information is preferably recorded in conjunction with the hidden information in a blockchain system chosen as decisive by an issuer of the document. Thus, the blockchain system may be that associated with, for example, bitcoin or some other cryptocurrency, or it may be a blockchain system that is otherwise provided. The recording with the blockchain of bitcoin or another cryptocurrency can be effected for example via a transaction using bitcoin or another cryptocurrency, wherein the public and the hidden information are recorded as part of the transaction. This record then allows for third party verification by verifying that the hidden information has been property recorded against the public information (for example serial number) when attempting to use the value of the document.

It is an object of the present invention, inter alia, to make information hidden inside a document visible in a simple manner by irreversible destruction of the document in such a way that the information becomes easily readable after being made visible. This object is achieved in particular by applying the information to a tear film which has a significantly higher tear resistance than the material surrounding it from which it is torn out when the information is exposed. The tear film is for example a polyester film having a tensile strength of >35 N (determined according to DIN EN ISO 527, wherein the test specimen used is the unchanged, unembedded polyester film) and/or a breaking strength (determined according to ISO 1924-2) of >35 N which is covered by a paper ply which, as a paper ply, has a breaking strength (determined according to ISO 1924-2) of only about 15 N for example. The invention thus differs significantly from the prior art, where a for example fibrous tape is removed from a likewise fibrous matrix and wherein the separation of the tape from the matrix is produced by adjusting the cohesion between the tape and the matrix. However, this does not sufficiently ensure that the tape can be torn out of the matrix without itself tearing but rather only that the side with the lower cohesion is easier to remove from the fibrous composite than the side with the higher cohesion. There is also no guarantee that no fibrous components of the matrix will adhere to the tape and at least partially cover the information on the tape because even if the cohesion is set to a low level it will not be possible to avoid fiber pieces and particles from the fibrous composite from remaining on the likewise fibrous tape. In the case according to the invention, the tear film is separated from the polymer layer with the result that be introduced information cannot be even partially covered by fibrous constituents.

One important aspect of the present invention is inter alia based on the fact that clean tearing of the tear film out of the document is effected solely via the application of force without special measures needing to be taken to ensure clean tearing-out. In particular, perforations, incisions or other types of weak points along the planned tear line are not necessary and preferably not present. A clean, directed tear line results automatically and by itself from the difference in tear the strengths of the tearfilm and the surrounding material. No complex and costly additional operating steps which predetermine a tear direction, for example through introduction of a perforation line, are necessary. For the same reason, it is not necessary to introduce a tear initiation point. Especially in the preferred embodiment, where the first layer of paper is stamped out over the tear film, a weakening of the document and a grip point naturally occur for easier tearing-out of the tear film without any need for additional attachment of a tear starting aid such as for example a perforation or incisions. In a preferred embodiment the tear film is opaque and in a particularly preferred embodiment said film is opaque and reflective. i.e. metallized for example. This has the advantage that the information on the tear film is not visible or readable in transmitted light and that the tear film is not intrusively visible in incident light as would be the case for a black opaque coating for example. This configuration ensures that the tear film does not appear intrusive in the document. Relative to the prior art the approach of making the tear film itself opaque has significant security bandages. The prior art proposes hiding the information on the introduced tape in the document by providing the document with an opaque coating on its outside. However, such an external opaque coating can be removed, the information read, and the opaque coating replaced without this being immediately detectable. Another possibility is that of making the opaque coating temporarily translucent by impregnating it for example with a highly refractive liquid, for example an aromatic or chlorinated solvent. This makes the underlying information readable from the outside. After evaporation of the liquid the original state of the document is restored without it being detectable that the information has been read. In the embodiment according to the invention a coating of the outsides of the paper is unnecessary since the information on the tear strip is itself covered on at least one side by an opaque, preferably metallic, layer. A second substantial advantage of the embodiment according to the invention over the prior art is that it makes it possible to produce comparatively thin documents which nevertheless adequately cover the hidden information. The specific exemplary embodiment produces a composite having a basis weight of typically 105 g/m2 (measured in regions consisting only of a first paper ply, a second paper ply and a plastic layer) or typically 145 g/m2 based on the region of maximum thickness or maximum basis weight consisting of a first paper ply, a second paper ply, a plastic layer, a tear film and a metallized hologram film applied to the second paper ply. The systems disclosed in the prior art require a relatively high basis weight of nominally 350 g/m2 to achieve sufficient opacity to mask the information. For a document according to the invention which is to have similar, in particular haptic, properties to a traditional bank note a basis weight of 200 g/m2 is markedly too high.

In a first preferred embodiment the substrate is accordingly characterized in that the multilayer substrate comprises public information correlated with the hidden information, wherein this public information is arranged on the exposed surface of the first or second paper ply and/or on the surface of the strip-shaped tear film facing the first paper ply which is visible through at least one corresponding window-shaped cutout in the first paper ply. It may preferably be the case that the hidden information is a digital private key and the public information is a digital public key, wherein especially preferably the information is in the form of a readable optical pattern, in particular in the form of a barcode, pixel pattern, QR code, color code (in particular JAB code), another code format or a combination thereof. Simpler codes in the form of digits or alphanumeric sequences are also conceivable.

A preferably optical and/or magnetic and/or electromagnetic cover layer may be arranged on the inside of the first paper ply at least in the region of the hidden information and the hidden information may be arranged facing the strip-shaped tear film on this cover layer, so that the hidden information cannot be read from the side of the first paper ply, in particular not with the naked eye or with an optical reader.

This cover layer and/or the hidden information is preferably in register with window-shaped cutouts in the first paper ply and is preferably provided substantially only over a width corresponding to a width of the strip-shaped tear film.

In a further preferred embodiment the substrate is characterized in that there are no further paper plies in addition to the first paper ply and the second paper ply and in that the paper plies have a basis weight in the range 10-110 g/m2, especially preferably in the range of 20-50 g/m2.

The plastic layer typically has a basis weight of more than 20 g/m2 and at most 100 g/m2, preferably a basis weight in the range of 22-80 g/m2, in particular in the range of 25-45 g/m2. In relative terms the plastic layer preferably has a thickness of 10-50 µm, especially preferably a thickness in the range of 30-40 micrometers.

The strip-shaped tear film may preferably be a plastic strip made of a material, preferably polyester, having a tear strength of at least 70 N/mm2, preferably at least 115 N/mm2, particularly preferably in the range of 70-150 N/mm2. The tear strength is preferably 30-40 N or 34-74 N at a strip width of 15 mm and a strip thickness of 33 micrometers or 30-40 N or 23-50 N at a strip width of 10 mm and a strip thickness of 33 micrometers. In practice, the breaking strength F (in N) is determined according to ISO 1924-2, the tear strength R (in N/mm2) is calculated therefrom by normalizing to strip thickness d (in mm) and strip width b (in mm) using the following formula:

$$R=F/(b*d)$$

In practical use, it is relevant that the tearing-out of the tear film is possible with a markedly lower applied force than the applied force that is necessary to tear the tear film itself. This is the only way to ensure that the hidden information can be reliably and effortlessly exposed without breakage of the tear film which could otherwise destroy the hidden information. In the case of the specific exemplary embodiments below the conditions are as follows (determined on a tensile testing machine according to standard ISO 1924-2, takeoff speed 300 mm/min): Tearing out the packet consisting of the tear film (width: 11 mm) and the first paper ply requires an (absolute) applied force of typically 1.75-2 N. Tearing up the packet consisting of the laminating film and the first paper ply requires an applied force of typically 60 N. It is therefore possible to achieve separation of the packet consisting of the tear film and the first paper ply from the remaining composite with a substantially lower applied force and along a cleaner separation line without the risk of tearing the package composed of the laminating film and the first paper ply which could cause a loss of the information present thereon.

The strip-shaped tear film may be made of oriented polyethylene, polypropylene, polyester, polyamide or a mixture thereof, wherein it is preferably composed of PET (polyethylene terephthalate) and wherein the strip-shaped tear film preferably has a thickness in the range of 6-45 µm, especially preferably in the range of 20-40 µm.

The strip-shaped tear film may additionally have security features arranged on it, in particular in the form of magnetic and/or optical features, preferably in the form of holograms and/or kinegrams.

The strip-shaped tear film has a width in the range of 5-25 mm, especially preferably in the range of 8-15 mm.

The first paper ply preferably comprises at least two window-shaped cutouts along the extension direction of the strip-shaped tear film, preferably at regular intervals. Public information arranged on the exposed surface of the strip-shaped tear film is preferably visible to the human eye through the transparent or translucent plastic layer through these window-shaped cutouts.

The first paper ply may comprise at least two window-shaped cutouts along the extension direction of the strip-shaped tear film, preferably at regular intervals, wherein at least one of these cutouts is exposed at an edge. This is particularly advantageous since the strip-shaped tear film can then be gripped by hand at this edge in the region of this cutout and the strip-shaped tear off film can be particularly easily torn out of the second paper ply to expose the hidden information.

It is preferable when, similarly to the plastic layer, the first paper ply and the second paper ply cover the entire surface except for window-shaped cutouts exposing the underlying plastic film that are optionally provided in the first and/or second paper ply, wherein the window-shaped cutouts in the first and the second paper ply may also be at least partially in register, thus forming a light transmission window in the substrate.

The substrate is preferably a value document, in particular in the form of a bank note, share certificate, security document, passport document, value card, goods voucher, lottery ticket or a crypto token.

Suitable materials for the preferably transparent plastic layer include for example the following materials: polyethylene (PE), polypropylene (PP), polyvinyl chloride (PVC), plasticized PVC (PVC-P), polystyrene (PS), polyester, co-polyester, polycarbonate (PC), polymethyl methacrylate (PMMA), polyoxymethylene (POM), polyethylene terephthalate (PET), polyether ether ketone (PEEK), polyamide (PA).

Suitable preferred polyamides include in particular polyamide 6 (PA6) copolyamide 12 (PA12), wherein inter alia amorphous forms are preferred. Mixtures (blends) or copolymers of the aforementioned polymers are also possible. Amorphous co-polyamide, preferably based on PA12, is preferred for example. Also possible are cycloaliphatic transparent polyamides, for example based on MACM, preferably MACM12.

In a further preferred embodiment the thermoplastic polymeric material of the plastic layer has a glass transition temperature Tg and/or melting point Tm above 0° C., preferably above 40° C. In the case of such materials the extrusion may be operated with a melt temperature in the range of 250-350° C. for example, wherein this temperature is preferably established at the outlet of the slot die. It has been found that an extrusion at a viscosity in the range of 50-1200 Pa s, in particular in a range of 500-1000 Pa s, is advantageous.

As mentioned hereinabove the thermoplastic polymeric material of the plastic layer is in particular a transparent material and in regions of windows said materials have a high transparency and exhibit a smooth surface. The material of the plastic layer is a, preferably amorphous, polyamide, preferably having a glass transition temperature above 20° C., a polyamide 12 and/or an amorphous copolyamide 12 being particularly preferred. The paper layers have a basis weight in the range from 10 to 80 g/m2, particularly preferably in the range from 20 to 40 g/m2. In a preferred embodiment the at least one paper ply is a security paper. In a further preferred embodiment at least one paper ply has a watermark. The papers may have been produced, for example, on a cylinder mold paper machine or on a fourdrinier paper machine.

At least one of the paper plies may have at least one security feature, preferably selected from the group of: watermarks, in particular greyscale watermarks, security threads. OVD, mottled fibers, security pigments, iridescent color applications, chips, in particular RFID chips, transponders, magnetic strips.

The plastic layer may itself comprise at least one security feature, preferably selected from the group of: mottled fibers, planchettes, metal fibers, marking materials, IR or UV dyes, security pigments, fluorescent dyes, effect pigments, interference pigments, metal pigments, reactive dyes, UV absorbers, stabilizers, wherein these security features may be added to the melt as additives or may be scattered in the vicinity of the roller nip.

The invention further relates to the use of such a multilayer substrate as a banknote, share certificate, security document, passport document or crypto token.

The present invention further relates to a process for producing a multilayer substrate as specified hereinabove which is especially preferably characterized in that the plastic layer is supplied between the paper plies in the molten state and the paper plies are subsequently pressed between a roller pair in a continuous process, wherein an integral bond between the paper plies and the plastic layer is achieved and wherein the strip-shaped tear film is applied to the second paper ply or introduced into the roller nip before combination of the paper plies.

It is preferable when the paper plies are each supplied from a roll, initially window-shaped cutouts are cut out optionally in at least the first paper ply and/or the hidden information, optionally on a previously applied cover layer, preferably in register with the cutouts, is applied (for example applied as a patch or printed) to the future inside of the first paper ply and the strip-shaped tear film, optionally after application of the public information and/or the hidden information onto the side thereof facing the future first paper ply, is supplied into the roller nip bonded onto the second paper ply (for example hot stamping) and/or lying on the second paper ply, wherein the supplying of the strip-shaped tear film is preferably carried out in register with the cutouts in the first paper ply.

This substrate may preferably be produced using a process as described in WO 2006/066431, wherein a single paper layer is arranged on each side of a single plastic layer. Explicit reference is made to the disclosure of WO 2006/066431 with regard to the production process and the disclosure content of WO 2006/066431 is hereby explicitly incorporated by reference in this regard.

The resulting multilayer substrate in the form of a continuous web is typically stamped or cut into individual pieces, wherein stamping or cutting is preferably carried out in register such that at least an edge of the piece, normally two opposite edges of the piece, in each case overlaps with a window-shaped cutout in the first paper layer, with the result that the cutout is exposed there.

Further embodiments are specified in the dependent claims.

BRIEF DESCRIPTION OF THE DRAWINGS

Preferred embodiments of the invention are described below with reference to the drawings, which are for elucidation only and are not to be interpreted as restrictive. In the drawings.

DESCRIPTION OF PREFERRED EMBODIMENTS

Figure 1:
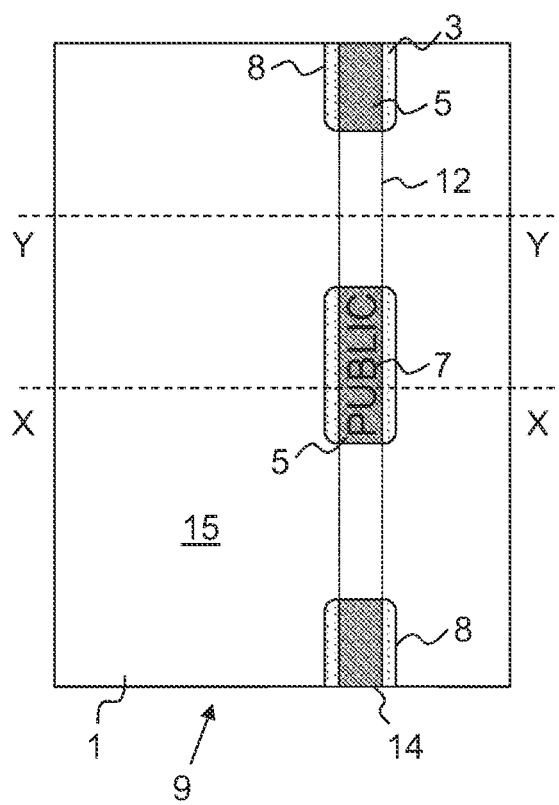
FIG. 1 shows a print carrier according to the invention in various views, in a) in an intact state in a view of the top surface (the first paper ply), in b) in the torn-open state in a view of the bottom surface (the second paper ply), in c) in a section along X-X in a), in d) in a section along Y-Y in a) according to a first embodiment, in e) in a section along Y-Y according to a second embodiment and in f) in a schematic section according to the second embodiment in the torn-open state.
Figure 1:
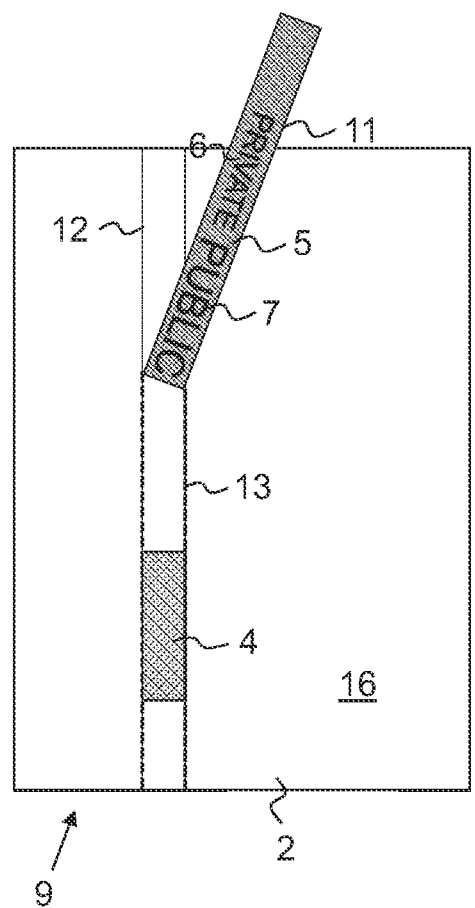
Figure 1:
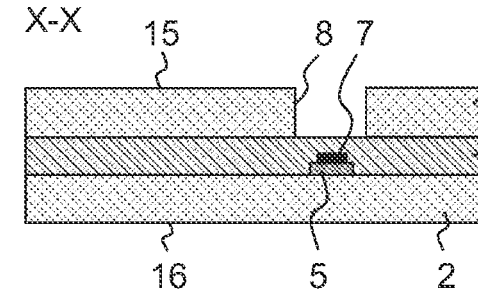
Figure 1:
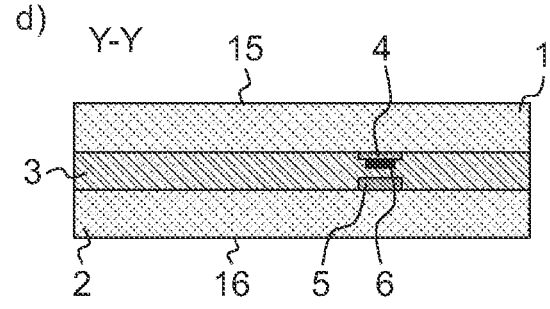
Figure 1:
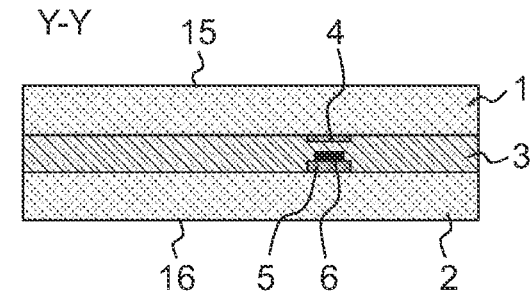
Figure 1:
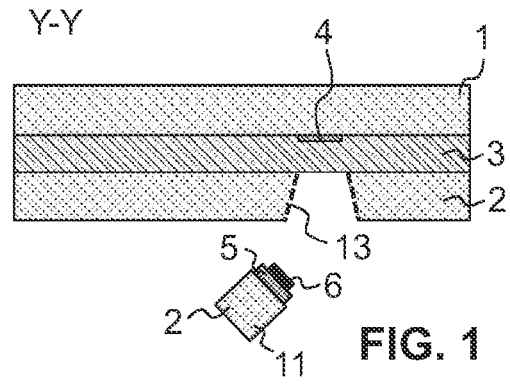

FIG. 1 shows in a) a multilayer substrate or a print carrier 9 in a top view in the still intact state where the hidden information has not yet been exposed. It is possible to see the first paper layer 1 and, through openings or cutouts 8 provided in this first paper layer 1 that form windows, through to the plastic layer 3 and the laminating film strip or the strip-shaped tear film 5 arranged behind it. The dashed line 12 shows in schematic form the extent of the covered strip of tear film, i.e. the tear film extends along one of the edges of the multilayer substrate.

The top surface 15 is therefore visible. There is public information 7 on the tear film 5 in the regions of the cutouts 8 and this is in each case visible through the material of the plastic layer 3 (the plastic layer is composed of a transparent or translucent material). This is indicated here with the wording "PUBLIC" but can also be digital information in the form of a barcode or a QR code for example. This public information 7 is in register with the cutouts 8 so that it is only the public information that is visible through the windows. The public information is individualized, i.e. different and uniquely identifying for each document. The same applies to the hidden information.

The print carrier 9 is specially cut in such a way that at least one of the windows 8 effectively passes through the edge, and therefore at least one exposed window 14 is provided at the edge. The production process normally ensures, as shown, that the windows are edge-cut from two opposite edges. Such edge-cut windows preferably do not have any public information. The tear film strip 5 is then easy to grip and tear out of the print carrier in this edge-cut window region.

FIG. 1b) shows the situation in a view from the other side where such a strip of tear film 5 has been partially torn out of the print carrier by gripping in region 14. The tear film 5 is effectively torn out through the bottom surface 16, i.e. through the second paper layer 2 to form a strip in it, so that the hidden information 6 "PRIVATE" which is in this case likewise arranged on the tear film 5 now becomes visible in each case between the public information 7. This occurs according to FIG. 1b) effectively on the turned-over bottom surface of the strip 11. In order to ensure that this hidden information or private information 6 also cannot under any circumstances be detected in the intact carrier 9 in transmitted light, a cover layer 4 or an opaque layer is arranged on the inside of the first paper layer 1 in each case in register between the windows. This may also be a hologram which is then applied for example before the windows are formed and then stamped out in sections with the windows. FIG. 1c) shows the section along XX in FIG. 1a). It is apparent here how a single plastic layer 3 is arranged between the first paper layer 1 and the second paper layer 2 and the tear film strip 5 is arranged on the second paper layer 2. The tear film strip 5 is typically secured or bonded to this second paper layer 2 in a hot stamping process.

The public information 7 is shown on the side facing away from the second paper layer, in the region of the window cutout 8 shown here.

FIG. 1d) shows the section along Y-Y in FIG. 1a). However, what is shown here is not the exemplary embodiment according to FIG. 1b) but rather an exemplary embodiment where the hidden information is provided not on the tear strip 5 but rather on the region of the cover layer 4. If this exemplary embodiment were effectively to be torn out as shown in FIG. 1*b*) the wording "PRIVATE" would become visible not on the security strip but rather in the region of the cover layer 4 still in the print carrier.

The variant according to FIG. 1*b*) in a section along Y-Y is shown in FIG. 1*e*). The hidden information 6 is likewise arranged on the tear film 5 but in this case in the region where no cutouts are provided and is then made visible on the tear film upon tearing-out of said film as shown in FIG. 1*b*).

Finally, FIG. 1*f*) shows in schematic form for this exemplary embodiment how the torn-out tear film 11 is torn out of the second paper layer 2 together with a paper strip and how this forms an irregular torn edge 13. The tearing-out damages the second paper layer 2 to such an extent that reconstitution is impossible without it being immediately detectable that manipulation has occurred and the hidden information has been read.

Figure 2:
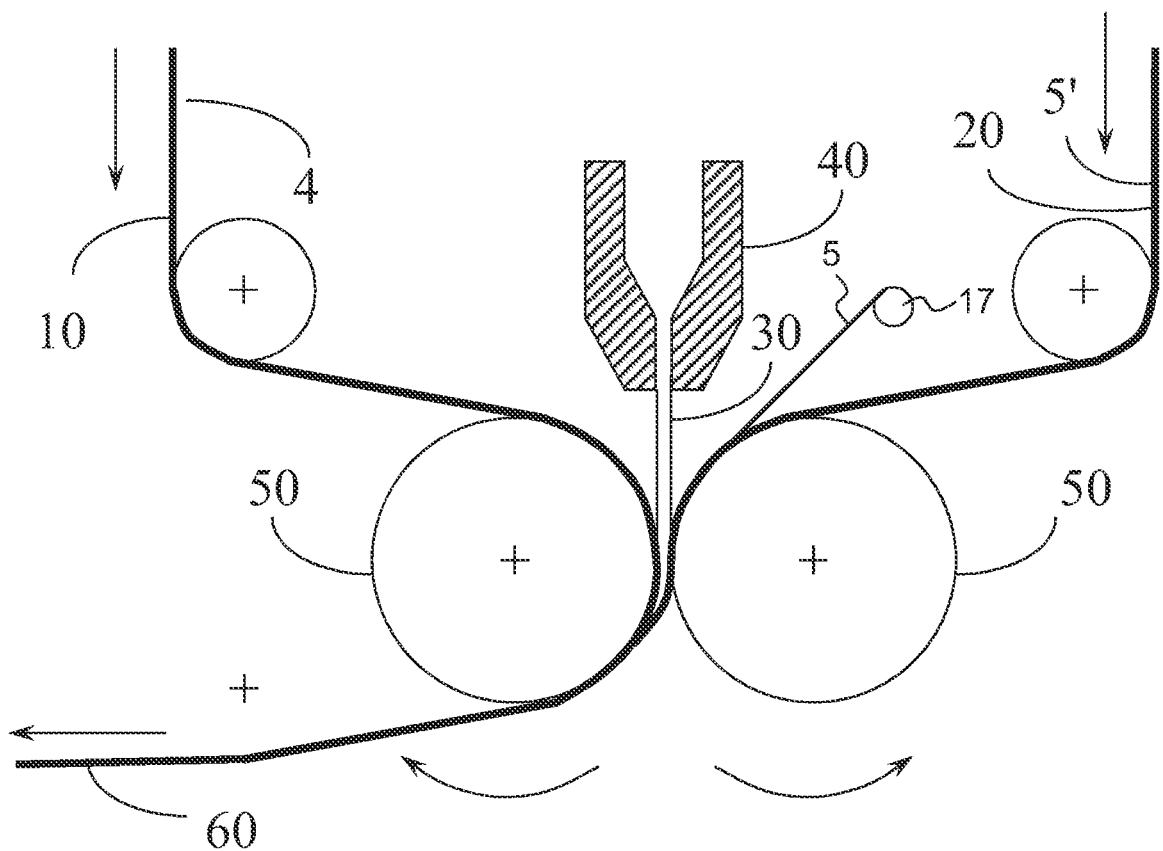
FIG. 2 shows a schematic process for producing a multilayer composite according to the invention by melt introduction by extrusion and supplying of the tear strip.

As shown in FIG. 2, polymer pellets are melted and conveyed in an extruder and via a wide-slot die 40 extruded directly onto or between the paper plies supplied, for example, from a roll in the molten phase as polymer melt 30. This forms a multilayer substrate 60 based on a first paper ply 10 and a second paper ply 20 and polymer 80, wherein the polymer is introduced already in molten form as polymer melt 30.

The strip-shaped tear film 5 can be introduced directly into the roller nip from roller 17, preferably in such a way that it is passed onto the future inner surface of the second paper ply 20 before supplying of the polymer melt 30. To ensure even better adhesion the tear film 5' may also be bonded or sealed (hot stamping process) onto the future inner surface of the second paper ply 20 earlier in the process. It is possible for example to provide the tear film with an adhesive layer and to tear off a cover film shortly before supplying so that this adhesive layer subsequently serves as an adhesion promoter layer to the second paper web 20. In the case of window-shaped cutouts in the first paper web the supplying of the strip-shaped tear film is typically carried out in register therewith.

The recited cover layer or hologram film 4 can also be provided on the other paper web 10 before combination.

In this context the term "molten phase" is to be understood as meaning a state of the polymer characterized by increased deformability or reduced viscosity. The viscosity is in a range suitable for polymer processing, in particular flat film production, of between 20 and 2000 Pa s, preferably in the range from 50 to 1000 Pa s, in particular between 75 and 500 Pa s. It is immaterial whether the polymer melt is a polymer with a defined melting point Tm or a defined melting interval Tm±ΔT at a temperature above the melting temperature or whether it is a polymer without a defined melting point that has been heated far enough above the glass transition temperature Tg that the viscosity of the material is reduced to such an extent that processing in the suggested fashion is possible. Polymers that fall into the first class are, for example, microcrystalline polymers such as polyethylene (PE), polypropylene (PP), polyethylene terephthalate (PET), polyamide 6 (PA6), polyamide 12 (PA12), microcrystalline co-polyamides and microcrystalline co-polyesters. Polymers that fall into the second class are, for example, amorphous polymers such as polyvinyl chloride (PVC), polystyrene (PS), polycarbonate (PC), polymethyl methacrylate (PMMA), but also amorphous co-polyamides (for example based on PA12 and/or MACM or PACM) and amorphous co-polyesters, such as are produced for example by Ems (EMS Chemie, Domat-Ems, Switzerland).

Figure 3:
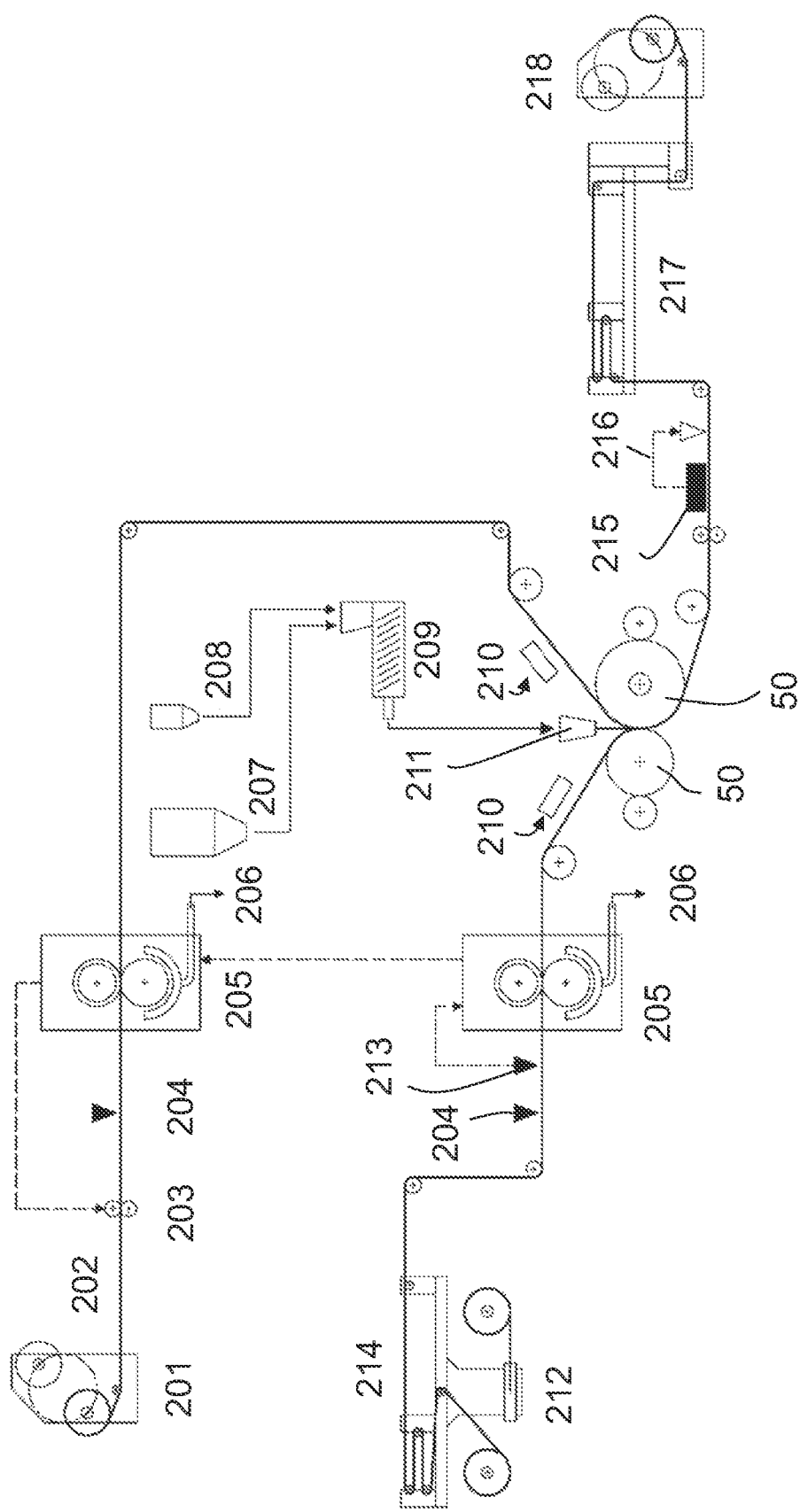
FIG. 3 shows a diagram of a complete line for producing a multilayer composite according to the invention.

FIG. 3 shows in schematic form a line which produces a multilayer substrate according to the invention consisting of a first ply of watermark paper 214 having full-depth cutouts coordinated with the watermarks and of a ply of paper 202 having cutouts coordinated with the cutouts of the first ply and of an inner polymer layer which is extruded in molten form between the two paper plies which are provided with full-depth cutouts and combined in register. Solid arrows denote material transport, dashed arrows denote data flow.

The paper web 202 made of conventional paper is in this case supplied from an unwinder 201 and led first through a tension controller 203 and a web edge controller 204. The cutouts are then produced in a stamping unit 205 and the stamped-out portions are removed in an extractor 206.

The paper web 214 made of watermarked paper in turn is supplied via an unwinder 212 and introduced into the process via a web edge controller 204. Downstream thereof is a watermark reader 213 and in turn a stamping unit 205 for producing the cutouts in a manner in register with the watermarks.

Simultaneously therewith the plastic layer or the material used therefor is prepared in that material is supplied from a metering means 208 and a dryer 207 and optionally blended with a further material, for example a masterbatch, from a metering means 208 and passed to a slot die 211 via an extruder 209.

The two paper webs 202/214 are rolled into the roller nip between the two rollers 50 while simultaneously supplying the plastic from the slot die 211. Before combination the webs and/or strips provided thereon may be printed with hidden information, public information or else with cover layers 4 using printers 210, preferably inkjet printers. The resulting multilayer laminate is subsequently checked in a web inspection final checking means 215 and marked with an optionally present inkjet marking means 216 and passed through a web accumulator/cutting table 217 and rewound at the end of the apparatus 218.

In a preferred form the molten polymer supplied is a multilayer melt curtain composed of different polymers. The structure of such a multilayer melt curtain is preferably symmetrical, for example with an inner layer of a first polymer and two respective outer layers of a second polymer. It is preferable when the softening temperature of the outer polymer is below that of the inner polymer or the outer polymer has a lower melt viscosity than the inner polymer at the prevailing processing conditions. This makes it possible, through suitable choice of the outer polymer, to optimize the bond to the paper plies or the chemical resistance while a material for optimized formation of the windows may be selected as the inner polymer ply. Such a multilayer polymer ply is preferably made up of largely compatible polymers such as for example different types of polyamides or different types of polyesters. However, multilayer polymer plies composed of different polymer classes that are not necessarily compatible are also feasible, such as for example a polymer ply having an inner core of a polyamide and outer plies of polyolefins, for example polyethylene or polypropylene.

It may generally prove to be advantageous to pass the multilayer composite as tangentially as possible to the roller nip over a certain distance following introduction of the polymer, or at least to pass it away from the curved roller surfaces before complete cooling and lead it onward over a certain distance in a straight line, i.e. not curved around a radius, in order to allow the most complete solidification of the polymer layer possible in the finally desired position of the multilayer composite and to improve the planarity of the substrate.

At least one layer of the optionally multilayered polymer ply may have additives, for example marking substances, dyes, IR dyes, UV dyes, fluorescent dyes, substances with an anti-Stokes shift, security pigments, effect pigments, interference pigments, metal pigments etc., added to it.

The polymer layer can also be made thicker in certain regions. This may be achieved in particularly simple fashion with a segmented wide-slot die by opening individual lip segments somewhat more widely. This makes it possible to increase the application rate of the polymer in the region of the windows for example in order to obtain more stable windows. In addition, in the strip region in which a watermark may be located, it can also prove advantageous make the intermediate layer of polymer somewhat thicker than in adjacent regions in order to compensate for the thickness differences in the paper caused by the watermark and at the same time to maintain the contrast richness of the watermark. This also makes possible to easily achieve a tactile feature since the polymer layer, made thicker in some regions, results in a noticeable thickening and stiffening of the substrate in this region. It can also prove useful to make the zones in which the edges of the security document will later lie somewhat thicker, since these edges in particular are susceptible to wear and tear, which can be favorably influenced by increased polymer introduction.

In the production process of a multilayer substrate the strip-shaped tear film is incorporated between the plies here. As described above, said film is introduced into the roller nip and it is conceivable for example to additionally feed a security thread into the roller nip which is thus also securely incorporated between the individual plies. Ideally, the strip is provided with an adhesive, as is not unusual for security threads, and is guided over the temperature-controlled roller in such a way that it is already bonded to one paper layer by an adhesive bond, thus minimize the risk of the thread tearing off upon entering the polymer melt. Surprisingly, tear threads may be processed at the same by running them into the roller nip, even in cases where the melting point of the thread material is below the melt temperature of the polymer upon exiting slot die. It has been shown that the threads do not melt if the contact time is sufficiently short, which is the case with the desired production speeds of over 25 m/min. For example, security threads made of polyester and security threads made of monoaxially oriented polypropylene (MOPP) were successfully co-processed at speeds of 30 m/min and melt temperatures of 325° C. at the slot die.

In a preferred embodiment the thread is introduced over the window position so that the thread is visible in the window in the finished product. The window may be a transparent window formed from two openings superposed in register but may also be a semi-transparent window which is covered by paper on one side and has been formed from an opening in only a single paper ply. In the first case the security thread is directly visible in the window from both sides of the document while in the second case it is directly visible from only one side of the document and only visible in transmitted light from the opposite side. It it goes without saying that a plurality of windows may be accommodated in one document; in the case of semitransparent windows the coverings may be present on either side. In the latter case, using a security thread that is passed through a series of semi-transparent windows where the transparent sides alternate provides the possibility of obtaining a window thread in the document which has segments visible from either side of the document. By contrast, the papermaking method of introducing a window thread only allows segments of the thread to be visible from one side of the document but not the other. Furthermore, the paper plies may be printed, for example using the inkjet method, with the hidden information on the inside of the multilayer laminate during or before processing, optionally after the abovementioned cover layer has been applied in the relevant areas. This affords a a print, for example an individual print, hidden in the document which is not detectable even in transmitted light. It goes without saying that other printing methods applying a non-individual or else individual print that may be altered during the process are also conceivable. Alternatively or in addition the printing may also be applied to the outer paper surface. It is preferable to use offset printing units or flexo printing units which are easy to synchronize with the stamping units 205.

It is also possible to scatter, spray or blow in substances such as for example mottled fibers, planchettes, pigments, dyes, metal fibers, metal flakes, etc. in the vicinity of the roller nip during processing. This can be done either for one or for both paper layers but, alternatively or in addition, can also be done on the melt tail.

It is also possible during processing to apply objects onto the paper web or to supply them applied a carrier, for example tuned electronic circuits, transponders, electronic chips, RFID chips, electrically conductive structures, for example printed, etched or deposited coils or antennae, metal platelets, magnetic particles, etc.

In a preferred process the introduction of the molten polymer ply is effected via a melt curtain which is extruded from a slot die which is arranged at a certain distance from from the paper surface. This preferably brings about a physicochemical bond between the polymer ply and the paper plies without the use of a further adhesion promoter layer.

In an alternative production variant the introduction of the molten polymer ply is effected via a slot die which is in direct contact with the paper ply. This ideally makes it possible to achieve complete filling of the full-depth openings in the paper ply with polymer while the application rate on the rest of the paper ply is reduced.

In a further production variant the introduction of the molten polymer ply is effected via an application roller, for example using a three-roller unit, such as are known from coatings technology. In an alternative production variant the introduction of the molten polymer ply is effected via a gravure roller, such as are known from coatings technology. In a further production variant the introduction of the molten polymer ply is effected via a screenprinting roller, such as are known from coatings technology.

The molten polymer layer may be interrupted at least in regions.

The molten polymer layer may be a prepolymer, a polymer dispersion or a polymer solution which undergoes chemical or physical hardening and/or reaction and/or drying during or after bonding to the paper ply.

Example 1

A hologram film is applied to a first paper ply in a hot stamping process. As is known the hologram is applied to the paper ply by means of pressure and temperature and the carrier film is peeled off using a release layer between the carrier film and the hologram. The transferred hologram consists of a layer packet which would not be self-supporting without this carrier film.

A so-called laminating film is applied to a second paper ply using the hot stamping process. As is known this is a hologram film which does not include a release layer and wherein the carrier is not peeled off. As the tear film this film serves as a tear-open aid in the later inventive multilayer substrate.

The first and second paper plies are combined on an extrusion coating line, so that the two hologram films end up superposed substantially in register. This employs a process such as that described in EP 2 153 988 A1. A plastic melt is extruded between the two paper plies and the two ties bonded thereto. Beforehand a piece is cut out of at least the first paper ply (for example stamped out or cut out by laser cutting), namely such that the hologram film on the second paper ply becomes visible through the polymer ply due to the resulting opening in the later composite. Also beforehand at precisely this site the public key is printed onto the hologram film in the second paper ply using the ink jet method for example. The private key is printed at a different site on the hologram film of the second paper ply, namely at a site that will later be covered by the hologram film of the first paper ply, also using the inkjet method for example. The public key and/or the private key may alternatively be introduced with a marketing laser.

The combination of the two paper layers, which preferably have a basis weight of 30-40 g/m2 and at least one security feature, with the plastic layer which preferably has a thickness of 30-40 micrometers results in a multilayer composite which, in terms of its haptic properties, is closely related to traditional banknotes in terms of printability and anti-counterfeiting properties.

Example 2

A multilayer print substrate is produced analogously to Example 1, with the exception that an opaque coating is applied to the first paper ply instead of a hologram strip. This can be done, for example, using the screen printing method, gravure printing method, flexo printing method or by a doctor coating method. The opaque coating may be a color layer which is enriched for example with white pigments (for example titanium oxide, barium oxide), color pigments, metal pigments (for example aluminum pigments), black pigments (for example carbon black, carbon, iron oxide), magnetic pigments (for example iron oxide).

Example 3

A multilayer print substrate is produced analogously to Example 1, with the exception that only the public key is printed on the laminating film of the second paper by while the private key is printed on the hologram film of the first paper ply.

Example 4

A multilayer print substrate is produced analogously to any of Examples 1-3, with the exception that a hologram film or an opaque coating is applied to the first paper ply instead of a laminating film. When bonding the paper plies in the extrusion coating process a tear-open aid is additionally introduced between the first paper ply and the plastic ply or between the second paper ply and the plastic ply, for example in the form of a polyester strip or security thread.

Example 5

A multilayer print substrate analogous to Example 4, wherein at least one of the codes is applied to the tear-open aid.

Further Specific Exemplary Embodiment

A first paper ply having a grammage of 35 g/m2 is produced on a cylinder mold paper machine. This paper ply is a watermark paper which has at least one watermark per application (wherein an application is to be understood as meaning the later document). The watermarks are spaced apart longitudinally along the paper web at a distance corresponding to the application length and transversely to the paper web at a distant corresponding to the application width. This results in rows of watermarks on the paper web both in the longitudinal and the transverse direction. The paper ply also contains other security features such as mottled fibers and machine-readable pigments, for example up-converters. A second paper ply having a grammage of 35 g/m2 is also produced on a cylinder mold paper machine. This second paper ply does not contain any watermarks but does also contains security features such as mottled fibers and machine-readable pigments.

Hologram strips of 11 mm in width are applied to the first paper ply on a roll-on hot stamping line (for example, Steuer FoilJet, Kurz MHS-840 or Diavy DMB900). One hologram strip is applied per watermark row. Said strength can run over the watermarks but preferably runs parallel to the watermarks. The hologram strip is a hot stamped hologram where a layer packet consisting of an embossed hologram, a metallization and a heat seal lacquer as well as various additional functional layers is supplied on a carrier film (typically a polyester carrier) and applied to the paper layer by means of pressure and temperature to melt the hot seal lacquer and produce a bond with the paper ply and the carrier film is peeled off. This is accomplished as a result of the carrier film having a release layer opposite the layer packet.

A laminating film of 11 mm in width is applied to the second paper ply, also by the hot stamping process. This differs from the hologram film in that the carrier film does not have a release layer and is not peeled off after the hot stamping application. In the subject matter of the invention this carrier film serves as a tear-open aid or tear film. The laminating film is ideally at least as wide as the hologram film, in fact the laminating film is preferably at least 2 mm wider than the hologram film. The hologram film is at least as wide as the height of the private key later printed on the laminating film so that said key is in each case completely covered by the hologram film.

Hologram films and laminating films as described are available, for example, from Hueck Folien GmbH, Baumgartenberg, Austria, or Leonhard Kurz Stiftung & Co. KG, Fürth, Germany.

In a prior art extrusion coating line as described in EP 2 153 988 A1 the first paper layer is first stamped and then supplied to the roller nip in which a polymer melt is extruded onto the second paper ply from a slot die. The polymer used is preferably a poly(amide), in particular a poly(amide)-12 or a poly(amide)-6. The layer thickness in the composite is preferably 35 micrometers. The stampings are introduced in register with the watermarks and are introduced over the hologram film so that each stamping stamps out both the paper and the hologram film applied to it. The stamping may be wider than the hologram film, narrower than the hologram film or the same width as the hologram film and may overlap the hologram film on one side, on both sides, or may lie completely within the hologram film. The stamping is preferably wider than the hologram film. The same applies analogously to the width ratios and positioning of the stamping in the first paper ply relative to the laminating film on the second paper ply.

The second paper ply is processed simultaneously on the same extrusion coating line by initially printing a code onto the laminating film of the second paper ply using the inkjet method. A code pair consisting of a private key and a public key is printed per application.

The code may be an alphanumeric code but it is preferable to use machine-readable codes such as barcodes or QR codes.

The first paper ply (with the stampings) and the second paper ply (with the codes) are then combined in the roller nip and a polymer melt is extruded from a slot die (preferably onto the first paper ply) or between the first and the second paper ply. This polymer melt bonds the two paper webs together and forms a multilayer composite. The two paper plies are combined in such a way that the hologram film of the first paper ply and the laminating film of the second paper ply end up superposed inside the multilayer composite. The stamped-out regions of the first paper ply are completely covered by the polymer ply and the resulting window regions make the laminating film on the second paper ply visible. The window regions of the first paper ply are in register with the code of the second paper ply in such a way that in each case the public key on the laminating film of the second paper ply becomes visible through the window region but the private key remains hidden behind the hologram film of the first paper ply.

The resulting multilayer substrate is cut into print sheets on a cross cutter and further enhanced using various printing processes, in particular security printing processes such as are customary in banknote manufacturing. The individual documents are then cut out of the print sheets. In order to expose the private key of such a document, the cut edge over the laminating film is stretched to peel off the polymer ply from the laminating film. The laminating film can then be gripped and serves as a tear-open aid to tear open the second paper ply along the edges of the laminating film and separate the laminating film from the plastic ply. The private key on the laminating film is exposed but the document is irreversibly destroyed at the same time.

In order to facilitate tearing-open of the document a second window per document is preferably produced by stamping the first paper ply at a second site. This is also applied over the hologram film of the first paper ply but in a region which does not end up over a code on the laminating film of the second paper ply. The documents are then cut out of the sheets in such a way that this second window is cut through. This results in documents which each have a portion of such a second window at the upper edge and at the lower edge. The edges of the document are thus thinner at these sites over the laminating film since these comprise a superposition of only the second paper ply, the laminating film and the plastic ply, with the hologram film and the first paper ply missing. Stretching the plastic ply over the laminating film and thus separating the plastic ply from the laminating film is thus made easier, the laminating film is easier to grip and the tearing-open of the document using the laminating film as a tear-open aid is easier to accomplish.

Tearout Tests:

Samples having a width of 50 mm and a length of 140 mm are cut out of a multilayer substrate according to the above specific exemplary embodiment along the running direction of the introduced laminating film. The samples are cut out in such a way that the laminating film of 11 mm in width is centric to the transverse direction and is intersected by a window at the upper end and lower end in the longitudinal direction. At the upper end, the window region is manually stretched transversely to the running direction of the laminating film, thus making the laminating film grippable. Said film, together with the second paper ply, is manually torn out a little in the direction of the lower end and clamped into the one displaceable jaw of the tensile testing machine. The upper end of the sample (without the torn-out piece of the laminating film) is clamped in the other, static jaw of the tensile testing machine. The jaws are moved apart at a constant speed of 300 mm/min, so that the laminating film together with a piece of the second paper ply is torn out in the direction of the lower end of the sample (situation analogous to FIG. 1b, lower end of sample in the figure above): the force necessary therefor is plotted in a force-displacement diagram. A distance of 70 mm is measured, the values of the first and last 10 mm are discarded and the force is averaged over the middle 50 mm. The average peel force thus determined on three samples is between 1.75 N and 2.0 N.

In a second step the partially torn-out packet of the laminating film and the second paper ply is completely torn out manually over the full length of 140 mm and stretched until breakage in a tensile testing machine. The average breaking force thus determined on three samples is 61.72 N.

LIST OF REFERENCE NUMERALS

| | | | |
|---|---|---|---|
| 1 | first paper layer | 80 | polymer ply |
| 2 | second paper layer | 90 | opening |
| 3 | plastic layer | 91 | region where polymer ply is exposed on only one side |
| 4 | cover layer/opaque layer/hologram film | 100 | window |
| 5 | laminating film strip/tear film | 110 | watermark |
| 6 | hidden information/private key | 201 | unwinder, non-stop |
| 7 | public information/public key | 202 | paper web |
| 8 | opening/window | 203 | tension controller |
| 9 | multilayer substrate/print carrier | 204 | web edge controller |
| | | 205 | stamping unit |
| 10 | first paper ply | 206 | extractor |
| 11 | strip of the second paper they are with torn out tear film | 207 | dryer |
| | | 208 | metering means |
| 12 | schematic representation of covered strip of tear film | 209 | extruder |
| | | 210 | (inkjet) printer |
| 13 | tear edge | 211 | slot die |
| 14 | exposed window on edge | 212 | unwinder/splicer |
| 15 | top surface | 213 | watermark reader |
| 16 | bottom surface | 214 | security paper web, watermark paper |
| 17 | feed roll for teat film strip | | |
| 20 | second paper ply | 215 | web inspection final checking means |
| 30 | polymer melt | | |
| 40 | wide-slot die | 216 | ink jet marking |
| 50 | roller pair | 217 | web accumulator/cutting table |
| 60 | multilayer substrate | | |
| | | 218 | rewinder |

The invention claimed is:

1. A multilayer substrate comprising
at least one first paper ply,
at least one second paper ply and
a plastic layer having two sides arranged between the paper plies and directly bonded to the paper plies on both sides of said plastic layer, which plastic layer is made of at least one thermoplastic polymeric material, wherein between the paper plies on an inside of the second paper ply and at least partially embedded in the plastic layer a strip-shaped tear film is embedded, wherein hidden information is arranged on at least one of
an inside of the first paper ply and perpendicular to and, viewed from a side of the second paper ply, covered by the strip-shaped tear film
and a surface of the strip-shaped tear film facing the first paper ply and covered at least by the first paper ply;

wherein the hidden information can be exposed by irreversibly tearing the strip-shaped tear film out of the multilayer substrate together with a strip of the second paper ply; and wherein the multilayer substrate comprises public information correlated with the hidden information, wherein this public information is arranged on at least one of an exposed surface of the first or second paper ply and the surface of the strip-shaped tear film facing the first paper ply which is visible in a region of the public information through at least one corresponding window-shaped cutout in the first paper ply.

2. The multilayer substrate as claimed in claim 1, wherein there are no further paper plies in addition to the first paper ply and the second paper ply and wherein the paper plies have a basis weight in the range 10-110 g/m2,
or wherein the plastic layer has a basis weight of more than 20 g/m2 and at most 100 g/m2,
or wherein the paper plies are bonded to the plastic layer without adhesion promoter layer(s).

3. The multilayer substrate as claimed in claim 2, wherein the paper plies have a basis weight in the range 20-50 g/m2,
or wherein the plastic layer has a basis weight in the range of 22-80 g/m2, or in the range of 25-45 g/m2.

4. The multilayer substrate as claimed in claim 1, wherein the strip-shaped tear film is a plastic strip made of a material having a tear strength of at least 70 N/mm2,
or wherein the strip-shaped tear film is made of polyester, oriented polyethylene, other materials, or a mixture thereof,
or wherein security features are arranged on the strip-shaped tear film,
or wherein the strip-shaped tear film has a width in the range of 5-25 mm.

5. The multilayer substrate as claimed in claim 4, wherein the strip-shaped tear film is a plastic strip made of a material having a tear strength in the range of 70-150 N/mm2,
or wherein the strip-shaped tear film has a thickness in the range of 6-45 µm, or in the range of 20-40 µm,
or wherein security features, in the form of holograms and/or kinegrams, are arranged on the strip-shaped tear film,
or wherein the strip-shaped tear film has a width in the range of 8-15 mm.

6. The multilayer substrate as claimed in claim 1, wherein, as with the plastic layer, the first paper ply and the second paper ply cover an entire surface of said multilayer substrate.

7. The multilayer substrate as claimed in claim 1, wherein said multilayer substrate is a value document.

8. The multilayer substrate as claimed in claim 1, wherein at least one of the paper plies comprises at least one security feature.

9. The multilayer substrate as claimed in claim 1, wherein the plastic layer comprises at least one security feature.

10. A method of using a multilayer substrate as claimed in claim 1 as a bank note, share certificate, security document, passport document, value card, goods voucher, lottery ticket or crypto token.

11. The method as claimed in claim 10, wherein the paper plies are each supplied from a roll,
initially window-shaped cutouts are cut out in at least the first paper ply or the hidden information, on a previously applied cover layer, in register with the cutouts, is applied to a future inside of the first paper ply,
and the strip-shaped tear film, after application of the public information or the hidden information onto a side thereof facing the future first paper ply, is supplied into a roller nip bonded onto the second paper ply or lying on the second paper ply, wherein the supplying of the strip-shaped tear film is carried out in register with the cutouts in the first paper ply.

12. A process for producing a multilayer substrate as claimed in claim 1, wherein
the plastic layer is supplied between the paper plies in a molten state and the paper plies are subsequently pressed between a roller pair in a continuous process, wherein an integral bond between the paper plies and the plastic layer is achieved and wherein the strip-shaped tear film is applied to the second paper ply or introduced into a roller nip before combination of the paper plies.

13. The process as claimed in claim 12, wherein the multilayer substrate is formed from a continuous web that is stamped or cut into individual pieces.

14. The process as claimed in claim 12, wherein a resulting multilayer substrate in the form of a continuous web is stamped or cut into individual pieces, wherein stamping or cutting is carrier out such that an edge of a piece in each case overlaps with a window-shaped cutout in the first paper layer, with the cutout being exposed at the edge.

15. The process as claimed in claim 12, wherein the paper plies are each supplied from a roll,
initially window-shaped cutouts are cut out in at least one of the first paper ply and the hidden information is applied to a future inside of the first paper ply,
and the strip-shaped tear film is supplied into the roller nip bonded onto the second paper ply or lying on the second paper ply.

16. A multilayer substrate as claimed in claim 1, wherein the multilayer substrate is a print carrier in the form of a security paper.

17. The multilayer substrate as claimed in claim 1, wherein the hidden information is a digital private key
or the public information is a digital public key.

18. The multilayer substrate as claimed in claim 17, wherein at least one of the hidden information and the public information is in the form of a readable optical pattern in the form of a barcode, pixel pattern, QR code, color code or a combination thereof.

19. The multilayer substrate as claimed in claim 1, wherein an optical or magnetic or electromagnetic cover layer is arranged on the inside of the first paper ply at least in the region of the hidden information and the hidden information is arranged facing the strip-shaped tear film on this cover layer, so that the hidden information cannot be read from a side of the first paper ply with a naked eye or with an optical reader,
or wherein this cover layer or the hidden information is in register with window-shaped cutouts in the first paper ply and is provided substantially only over a width corresponding to a width of the strip-shaped tear film.

20. The multilayer substrate as claimed in claim 1, wherein the first paper ply comprises at least two window-shaped cutouts along an extension direction of the strip-shaped tear film, at regular intervals, and wherein at least one of these cutouts is exposed at an edge of said multilayer substrate.

21. The multilayer substrate as claimed in claim 1, wherein, as with the plastic layer, the first paper ply and the second paper ply cover an entire surface of said multilayer substrate except for window-shaped cutouts that are provided in the first or second paper ply, which cutouts expose underlying plastic layer, wherein the window-shaped cutouts in the first and the second paper ply are at least partially in register, thus forming a light transmission window in the substrate.

22. The multilayer substrate as claimed in claim 1, wherein said multilayer substrate is a value document in the form of a bank note, share certificate, security document, passport document, value card, goods voucher, lottery ticket or a crypto token.

23. The multilayer substrate as claimed in claim 1, wherein at least one of the paper plies comprises at least one security feature, selected from the group of: watermarks, including greyscale watermarks, security threads, OVD, mottled fibers, security pigments, iridescent color applications, chips, including RFID chips, transponders, magnetic strips.

24. The multilayer substrate as claimed in claim 1, wherein the plastic layer comprises at least one security feature, selected from the group of: mottled fibers, planchettes, metal fibers, marking materials, IR or UV dyes, security pigments, fluorescent dyes, effect pigments, interference pigments, metal pigments, reactive dyes, UV absorbers, stabilizers, wherein these security features may be added to a melt as additives or may be scattered in a vicinity of a roller nip.

25. A multilayer substrate comprising
at least one first paper ply,
at least one second paper ply and
a plastic layer arranged between the paper plies and directly bonded to the paper plies on both sides of said plastic layer, which plastic layer is made of at least one thermoplastic polymeric material;
wherein between the paper plies on an inside of the second paper ply and at least partially embedded in the plastic layer a strip-shaped tear film is embedded;
wherein hidden information is arranged on at least one of
an inside of the first paper ply and perpendicular to and, viewed from a side of the second paper ply, covered by the strip-shaped tear film
and a surface of the strip-shaped tear film facing the first paper ply and covered at least by the first paper ply;
wherein the hidden information can be exposed by irreversibly tearing the strip-shaped tear film out of the multilayer substrate together with a strip of the second paper ply; and
wherein a cover layer is arranged on the inside of the first paper ply at least in a region of the hidden information and the hidden information is arranged facing the strip-shaped tear film on this cover layer, so that the hidden information cannot be read from a side of the first paper ply.

26. A multilayer substrate comprising
at least one first paper ply,
at least one second paper ply and
a plastic layer arranged between the paper plies and directly bonded to the paper plies on both sides of said plastic layer, which plastic layer is made of at least one thermoplastic polymeric material,
wherein between the paper plies on an inside of the second paper ply and at least partially embedded in the plastic layer a strip-shaped tear film is embedded,
wherein hidden information is arranged on at least one of
an inside of the first paper ply and perpendicular to and, viewed from a side of the second paper ply, covered by the strip-shaped tear film
and a surface of the strip-shaped tear film facing the first paper ply and covered at least by the first paper ply;
wherein the hidden information can be exposed by irreversibly tearing the strip-shaped tear film out of the multilayer substrate together with a strip of the second paper ply; and
wherein the first paper ply comprises at least two or at least three window-shaped cutouts along an extension direction of the strip-shaped tear film.

27. The multilayer substrate as claimed in claim 26, wherein the first paper ply comprises at least two window-shaped cutouts along the extension direction of the strip-shaped tear film, and wherein at least one of these cutouts is exposed at an edge of said multilayer substrate.

28. The multilayer substrate as claimed in claim 27, wherein the first paper ply comprises said window-shaped cutouts along the extension direction of the strip-shaped tear film, at regular intervals, and public information arranged on an exposed surface of the strip-shaped tear film is visible to a naked eye through the transparent or translucent plastic layer through at least one of these window-shaped cutouts.

* * * * *